(12) United States Patent
Konabe et al.

(10) Patent No.: US 7,871,535 B2
(45) Date of Patent: Jan. 18, 2011

(54) COMPOSITION FOR DUST-PREVENTIVE TREATMENT

(75) Inventors: Kazuo Konabe, Shizuoka (JP); Mitsuyoshi Kawazoe, Shizuoka (JP)

(73) Assignee: Du Pont-Mitsui Fluorochemicals Co., Ltd., Chiyoda-Ku, Tokyo (JP)

( * ) Notice: Subject to any disclaimer, the term of this patent is extended or adjusted under 35 U.S.C. 154(b) by 147 days.

(21) Appl. No.: 11/922,420

(22) PCT Filed: Jun. 29, 2005

(86) PCT No.: PCT/JP2005/011901

§ 371 (c)(1), (2), (4) Date: Dec. 18, 2007

(87) PCT Pub. No.: WO2007/004250

PCT Pub. Date: Jan. 11, 2007

(65) Prior Publication Data

US 2009/0134355 A1     May 28, 2009

(51) Int. Cl.
C09K 3/22    (2006.01)

(52) U.S. Cl. .................... 252/88.1; 252/88.2

(58) Field of Classification Search .......... None
See application file for complete search history.

(56) References Cited

U.S. PATENT DOCUMENTS 2,559,752 A    7/1951  Berry 5,788,879 A *  8/1998  Ogura et al. ............... 252/88.1
2004/0186219 A1  9/2004  Dadalas et al.
2005/0113507 A1  5/2005  Bladel et al.

FOREIGN PATENT DOCUMENTS

| JP | 52-32877 SHO | 8/1977 |
| JP | 8-020767 A | 1/1996 |
| JP | 2002-532583 A | 10/2002 |
| JP | 2005-501956 A | 1/2005 |

\* cited by examiner

*Primary Examiner*—Necholus Ogden, Jr.
(74) *Attorney, Agent, or Firm*—Buchanan Ingersoll & Rooney PC

(57) ABSTRACT

A composition for dust-preventive treatment including an aqueous dispersion of fluorine-containing polymer showing a low potential for environmental concerns and a dust prevention effect as high as that of known composition for dust-preventive treatment. The composition for dust-preventive treatment includes an aqueous dispersion of fluorine-containing polymer containing 50 ppm or less of a fluorine-containing emulsifier. The composition for dust-preventive treatment comprising aqueous dispersion of fluorine-containing polymer containing 50 ppm or less of a fluorine-containing emulsifier can preferably be obtained by removing the fluorine-containing emulsifier from a polymer dispersion prepared by polymerizing tetrafluoroethylene using the fluorine-containing emulsifier.

2 Claims, No Drawings

COMPOSITION FOR DUST-PREVENTIVE TREATMENT

TECHNICAL FIELD

The present invention relates to a composition for dust-preventive treatment of a material having dusting property, that is a dusting material, comprising aqueous dispersion of a polytetrafluoroethylene (hereinafter referred to as PTFE) that is highly effective in preventing dust and there is less environmental concern. More specifically, the present invention relates to a composition for dust-preventive treatment of a dusting material comprising aqueous dispersion of a polytetrafluoroethylene containing a fluorine-containing emulsifier in specific low level that is highly effective in preventing dust and there is less environmental concern.

BACKGROUND TECHNOLOGY

The technology to prevent the dust derived from powdery material having dusting property is an important technology for daily life and industry from the standpoint of health, safety and environmental issues.

Japanese Patent Publication SHO 52-32877 discloses a method for preventing dust derived from dusting materials by mixing the dusting materials with PTFE and subjecting the mixture to compression-shearing at a temperature from about 20 to 200° C., thereby fibrillating the PTFE to prevent dusting of the powdery material.

The PTFE disclosed therein includes fine powder or emulsion form of homopolymer of tetrafluoroethylene denoted by TEFLON (registered trade mark) 6 or TEFLON (registered trade mark) 30, and also fine powder form of modified polymer of tetrafluoroethylene denoted by TEFLON (registered trade mark) 6C.

Japanese Laid-open Patent Application HEI 8-20767 proposes a dust-preventive method having good stability using an aqueous emulsion containing a hydrocarbon-base anionic surfactant of not less than 1.0 wt % of PTFE, and it discloses that the method is effective for cement dust prevention.

The above-mentioned PTFE particles are obtainable by such emulsion polymerization methods as disclosed in U.S. Pat. No. 2,559,752, in which tetrafluoroethylene is charged under pressure into an aqueous medium containing a water-soluble polymerization initiator and an anionic surfactant having hydrophobic fluoroalkyl radicals (called as a fluorine-containing emulsifier hereunder) as the emulsion stabilizer so as to be polymerized to form the PTFE aqueous emulsion. Further an emulsion stabilizer is added to the emulsion to improve the stability.

However, since these dust-preventive treatment agents are used in large quantities in fertilizers, soil stabilizers, soil solidification agents, reclamation materials such as an incinerated ash of coal and the like, and the scope application of dust-preventive treatment agent is expanding, concerns for the environmental impact has been increasing.

Though a surfactant (a fluorine-containing emulsifier) contained in the PTFE aqueous dispersion as an emulsifier is used in polymerization, it is difficult to decompose and causes concerns for the environmental impact. In addition, since such agent is not biodegradable and is classified as environmental pollutants, and it could potentially pollute ground water, lakes, marshes, rivers and the like.

Therefore, the inventors focused intensely on the improvement of a method that effectively prevents dust and can prevent dust without concern for the environmental impact. As the result, the present invention was developed.

Patent Reference 1: Japanese Patent SHO 52-32877.

Patent Reference 2: the Japanese Laid-open Patent Application HEI 8-20767

Patent Reference 3: U.S. Pat. No. 2,559,752.

DISCLOSURE OF THE INVENTION

Problems for the Invention to be Solved

The inventors proceeded to develop a dust-preventive treatment method with a low potential for environmental concerns after noticing that although a surfactant (fluorine-containing emulsifiers) present in aqueous PTFE dispersion as emulsifiers was essential in the polymerization to obtain the aqueous PTFE dispersion, it was difficult to decompose and was associated with environmental concerns.

That is, the objective of the present invention is to provide a composition for dust-preventive treatment comprising a aqueous dispersion of fluorine-containing polymer with a low potential for environmental concerns is used and a dust prevention effect is as high as that of known composition and further has lower potential for environmental concerns.

Methods to Solve the Problems

The present invention provides a composition for dust-preventive treatment comprising an aqueous dispersion of fluorine-containing polymer containing 50 ppm or less of a fluorine-containing emulsifier.

The mentioned above composition for dust-preventive treatment wherein the aqueous dispersion of fluorine-containing polymer is an aqueous dispersion comprising PTFE is a preferable embodiment of the present invention.

The mentioned above composition for dust-preventive treatment wherein the aqueous dispersion of fluorine-containing polymer is the aqueous dispersion of fluorine-containing polymer having an average particle size of from 0.1 μm to 0.5 μm is a preferred embodiment of the present invention.

The mentioned above composition for dust-preventive treatment wherein the aqueous dispersion of fluorine-containing polymer containing 50 ppm or less of a fluorine-containing emulsifier is obtained by removing the fluorine-containing emulsifier from polymer dispersion prepared by polymerizing tetrafluoroethylene using the fluorine-containing emulsifier is a preferred embodiment of the present invention.

EFFECT OF THE INVENTION

By the present invention, the composition for dust-preventive treatment comprising aqueous dispersion of fluorine-containing polymer that shows a low potential for environmental concerns and further a dust prevention effect as high as that of known composition is provided.

By the present invention, the composition for dust-preventive treatment that not only is highly effective in preventing dust and gives less environmental concerns, but also enables to effectively utilize the expensive fluorine-containing emulsifier by recovering and reusing is provided.

BEST EMBODIMENT FOR CARRYING OUT THE INVENTION

The present invention provides a composition for dust-preventive treatment comprising an aqueous dispersion of fluorine-containing polymer containing 50 ppm or less of a fluorine-containing emulsifier.

As the fluorine-containing polymer usable in the present invention, a homopolymer (PTFE) of tetrafluoroethylene (TFE) that is usually called as homopolymer, and a copolymer (modified PTFE) of tetrafluoroethylene containing a comonomer of not more than 1% that is usually called as modified polymer are cited. A homopolymer of TFE is preferred as the fluorine-containing polymer.

A dust-preventive treatment agent comprising an aqueous emulsion of the modified PTFE exhibits inferior dust preventing effect to that of the PTFE, and may frequently require over 50% excessive amounts of the agent to show the same effect.

In the fluorine-containing polymer in an aqueous dispersion of the fluorine-containing polymer of the present invention, colloidal particles in which an average particle size is about 0.1 µm to 0.5 µm or preferably about 0.1 µm to 0.3 µm is desirable. Colloidal particles having an average particle size of smaller than 0.1 µm tend to result in inferior dust preventing effect, and those of larger than 0.5 µm tend to bring about unstable aqueous dispersion.

In addition, it is desirable that a specific gravity is 2.27 or lower, preferably 2.22 or lower, more preferably 2.20 or lower. Polytetraflouroethylene having a specific gravity of larger than 2.27 tends to result in inferior dust preventing effect.

The concentration of fluorine-containing polymer in the aqueous dispersion of the fluorine-containing polymer of the present invention is not particularly restricted, but a concentration as low as possible is preferred in order to raise the dispersion effect of the fluorine-containing polymer in a dusting material. On the other hand, since the concentration as high as possible enables to save a transporting cost when the aqueous dispersion of the fluorine-containing polymer is transported, the concentration of normally 10% by weight or more, preferably 20% by weight to 70% by weight is desirable. Higher concentrations are not preferable since the stability of aqueous dispersion of the fluorine-containing polymer may be decreased. Therefore, the concentration of fluorine-containing polymer in the dust-preventive treatment agent composition, when it is sold as a product, is preferably 20% by weight to 70% by weight. When the treatment agent composition is mixed with the dusting material, it can be diluted with water to make the concentration of fluorine-containing polymer of 5% by weight or lower.

The lower content ratio is desirable for the fluorine-containing emulsifier in the aqueous dispersion of the fluorine-containing polymer of the present invention since it is hardly decomposed and its accumulation in the environment is concerned. A content ratio of 50 ppm or less is preferable since manufacturing at a stable fluorine-containing emulsifier percentage content using a practical removal method is possible.

The method to obtain the aqueous dispersion of fluorine-containing polymer of the present invention containing 50 ppm or less of the fluorine-containing emulsifier is not particularly restricted.

For example, such aqueous dispersion can be obtained by removing the fluorine-containing emulsifier by the known method from the aqueous dispersion containing the fluorine-containing emulsifier (perfluorooctanoic acid in the form of an ammonium salt and/or an alkali salt) in about 0.02% to 1% by weight based on the weight of the fluorine-containing polymer produced by emulsion polymerization method as disclosed in U.S. Pat. No. 2,559,752, wherein tetrafluoroethylene is charged under pressure into an aqueous medium containing a water soluble polymerization initiator and an anionic surfactant having hydrophobic fluoroalkyl groups as emulsifier.

As the known method for removing the fluorine-containing emulsifier from an aqueous dispersion, there can be cited methods described in Japanese Publication of PCT Application 2005-501956 (WO 2003/020836) and Japanese Publication of PCT Application 2002-532583 (WO 00/35971) wherein fluorine-containing emulsifier is separated and removed by contacting with a effective quantity of an anion exchange material, and in U.S. Pat. No. 4,369,226 wherein the fluorine-containing emulsifier is removed by ultra filtration of the aqueous dispersion of fluorine-containing polymer. The method to remove fluorine-containing emulsifier is not restricted to these methods.

Though the surfactant (the fluorine-containing emulsifier) contained in the PTFE aqueous dispersion as the emulsifier is essential because of its reaction inactivity in the polymerization, its removal as much as possible from a dust-preventive treatment agent is desired, since it is hardly decomposed and its environmental impact is concerned. In addition, it is desirable to recovery and re-utilize the fluorine-containing emulsifier because it is expensive.

The emulsifier disclosed in U.S. Pat. No. 2,559,752 may be selected and used as the emulsifier in the emulsion polymerization method used to obtain the aforementioned aqueous dispersion of fluorine-containing polymer of the present invention. For the objective of the present invention, the emulsifiers called as non-telogenic emulsifier is particularly preferable. For example, fluorine-containing alkanoic acids or their salts represented by $F(CF_2)_n(CH_2)_mCOOH$ (m is 0 or 1 and n is 6-20) containing about 6 to 20 carbon atoms, preferably about 6 to 12 carbon atoms, and fluorine-containing alkylsulfonic acids or their salts can be cited. As the salt, alkali metal salts, ammonium salts, amine salts etc. can be cited. Specifically, perfluoroheptanoic acid, perfluorooctanoic acid and their salts, 2-perfluorohexylethane sulfonic acids and their salts can be cited, but the acids and salts are not restricted to these examples.

Furthermore, the aqueous dispersion of fluorine-containing polymer of the present invention may also contain an emulsion stabilizer because it enhances the stability of the aqueous dispersion of fluorine-containing polymer. As the emulsion stabilizer, a hydrocarbon-base anionic surfactant is preferable. Since this surfactant forms a salt insoluble or hardly soluble in water with calcium, aluminum and iron that are essentially soil components, it can avoid the pollution of rivers, streams, lakes, swamps and underground water caused by surfactants.

As such a hydrocarbon-base anionic surfactant, higher fatty acid salts, higher alcohol sulfuric acid ester salts, liquid fatty oil sulfuric acid ester salts, aliphatic alcohol phosphoric acid ester salts, dibasic fatty acid ester sulfonic acid salts, alkyl allyl sulfonic acid salts, etc. are cited. In addition, Na, K, Li and $NH_4$ salts of polyoxyethylene alkyl phenyl ether ethylene sulfonic acids (n in polyoxyethylene is 1 to 6, the number of carbon atoms in the alkyl is 8 to 11), alkylbenzene sulfonic acids (the number of carbon atoms in the alkyl is 10 to 12) and dialkylsulfosuccinic acid esters (the number of carbon atoms in the alkyl is 8 to 10) can be cited as preferable examples since they impart excellent mechanical stability to a PTFE aqueous emulsion.

The amount of an emulsion stabilizer is 1.0% by weight or more based on the weight of PTFE, preferably in the range of 1.5% to 5% by weight. An amount less than 1.0 wt % provides unsatisfactorily stabilized aqueous PTFE emulsions, and that larger than 10 wt % is uneconomical.

The composition for dust-preventive treatment of the present invention is preferably used in a method that the dust derived from dusting material is prevented by mixing the fluorine-containing polymer with dusting material and subjecting the mixture to compression-shearing at a temperature from about 20 to 200° C., thereby fibrillating the PTFE to prevent the dust derived from dusting material, such method as described in Japanese Patents No. 2827152 and Patent No. 2538783.

In addition, the composition for dust-preventive treatment of the present invention may be used as the fibril forming PTFE described in the Japanese Laid-open Patent Application Nos. 2000-185956, 2000-185959 and 2002-60738.

The dusting material treated for dust prevention in the present invention is an inorganic and/or organic dusting material, and there are no particular restrictions on its substance and shape. The present invention can also be applied effectively to a dust forming powdery substance as the dusting material. Examples of particularly suitable dusting material include cement powder, calcium hydroxide powder, calcium oxide powder, calcium carbonate, slag powder, fly ash, gypsum and powdery metals, that is manufactured in large amount and are mass-transported by ships, trains and cars. In addition, various fillers such as talc, silica, carbon black, various activated carbon powder; clay, metal oxides, pigments, and others are cited.

The composition for dust-preventive treatment of the present invention can suitably be used for dust-preventive treating in the field of building material field, soil stabilizer field, solidifying material field, fertilizer field, landfill disposal field for burned ash and toxic substance, explosion-prevention field, cosmetic product field, and the like.

EXAMPLES

The present invention is more specifically explained by citing examples and comparative examples below, but the present invention is not limited to those examples by any means.

Measurements of the properties in the present invention were conducted according to methods described below.

(1) Average Particle Diameter of Fluorine-Containing Polymer Particles.

The average particle diameter of fluorine-containing polymer particles was measured using Microtrack UPA150, Model No. 9340 (manufactured by Nikki So).

(2) Particle Diameter of Dust Forming Powder.

Particle diameter of dust forming powder was measured with the laser diffraction/dispersion type particle size distribution meter manufactured by Horiba Seisakusho Co., Ltd. using ethanol as the dispersion medium.

(3) Standard Specific Gravity of Fluorine-Containing Polymers.

The specific gravity was measured according to ASTM D-4894.

The concentration of the PTFE aqueous dispersion obtained by emulsion polymerization is adjusted 15% by weight using pure water. And then, about 750 ml of the aqueous dispersion was putt in a polyethylene container (1,000 ml capacity) and the polymer was agglomerated by shaking the container vigorously by hand. The polymer powder separated from water was dried for sixteen hours at 150° C. 12.0 g of the dried resin powder was put in a cylindrical mold with a diameter of 2.85 cm and leveled. The pressure was gradually increased to reach a final pressure of 350 kg/cm$^2$ after 30 seconds. The final pressure of 350 kg/cm$^2$ was kept for two minutes. The preliminary molded article thus obtained was sintered in an air furnace for 30 minutes at 380° C., cooled to 294° C. at a rate of 1° C. per minute, kept at 294° C. for 1 minute then took it out of the air furnace and cooled at room temperature (23±1° C.) to obtain a standard sample. The weight ratio of the standard sample to the weight of water of the same volume at room temperature (23±1° C.) is made the standard specific gravity. This standard specific gravity is an aim of average molecular weight, and generally, the lower the standard specific gravity is, the higher the molecular weight is.

(4) Fluorine-Containing Emulsifier Concentration in Fluororesin Aqueous Dispersion.

A fluororesin aqueous dispersion in the polyethylene container was put in a freezer of −20° C. and frozen. The fluorine-containing polymer was agglomerated and separated from water. The contents of the polyethylene container were completely transferred to a Soxhlet extractor, and the extraction is conducted for 7 hours with about 80 ml of methanol.

Methanol used for the extraction is concentrated into 50 ml or less by distilling with evaporator. The concentrated methanol is put into 50 ml-mesflask and is diluted to prescribed amount with pure water to prepare a sample liquid. The sample liquid is measured by liquid chromatography, then the fluorine-containing emulsifier concentration in the fluororesin aqueous dispersion is calculated.

(5) Falling Dust Amount 200 g of a sample is fallen naturally from the top mouth of a cylindrical container with an internal diameter of 39 cm and a height of 59 cm. The floating dust amount [relative concentration (CPM: count per minute)] in the container at 45 cm high from the bottom was measured by a scattering light digital dust meter. The measurement of floating dust amount is carried out five times for 1 minute consecutively after the sample was put in and the measurement value (a dark count) before the sample was put in is subtracted. The geometric average value thus obtained is referred as the "falling dust amount". The geometric average value, x, was calculated according to the following formula.

$$\log x = \tfrac{1}{5}\Sigma \log(xi-d)$$

Here, xi is floating dust amount and d is a dark count.

(Raw Materials)

The raw materials used in the examples of the present invention and comparative examples are shown below.

(1) PTFE aqueous dispersion (I)

Properties of (I): Average particle diameter of 0.2 μm, resin solid concentration of 30% by weight, content of fluorine-containing emulsifier of 21 ppm, specific gravity of 2.19 and anionic surfactant content of 3.5% by weight based on the PTFE weight.

(2) PTFE aqueous dispersions (II).

Manufactured by Mitsui DuPont Fluorochemicals Co., Ltd., 312-J.

Properties of (II): resin solid concentration of 30% by weight, content of fluorine-containing emulsifier of 1040 ppm, specific gravity of 2.19 and anionic surfactant content of 3.0% by weight based on PTFE weight.

(3) Quick lime powder (CaO 93.5 wt % and MgO 4.2 wt %)

A quick lime powder that passed completely through a standard mesh sieve of 300 μm, left 0.04% on the standard mesh sieve of 150 μm, left 0.17% on the standard mesh sieve of 90 μm and passed 99.83% through a standard mesh sieve of 90 μm.

(4) Normal Portland cement (NPC) (manufactured by Taiheiyo Cement).

(5) Type II anhydrous gypsum (average particle diameter 9.0 μm and maximum particle diameter 101 μm).

(6) Blast-furnace slag powder (average particle diameter 8.9 μm and maximum particle diameter 100 μm).

Example 1

1000 g of quick lime powder was put into a 5 L capacity small soil mixer, and dispersion obtained by dispersing 1.67 g of PTFE aqueous dispersion (I) (equivalent to 0.05% by weight of PTFE resin solid component based on the quick lime) in 98.8 g of clean water was gradually put in under agitation with 140 r.p.m. of rotation speed. Steam was generated about 1 minute after input because of hydration reaction heat of quick lime, and for 2 minutes, all of the water was exhausted for hydration reaction of quick lime to form hydrated lime and then no steam generation was observed. The agitation of the mixer was stopped 5 minutes after the agitation was started. The temperature at this point measured with a mercury thermometer was 95° C. The dust-preventive treated quick lime was a mixture of the quick lime and the hydrated lime, which contains about 30% of hydrated lime newly formed because of the hydration. The falling dust amount of the dust-preventive treated quick lime was measured. The results are shown in Table 1.

Example 2

The dust-preventive treated quick lime was obtained in the same manner as in Example 1 except using dispersion obtained by dispersing 1.00 g of the PTFE aqueous dispersion (I) (equivalent to 0.03% by weight of PTFE resin solid component based on the quick lime) in 99.3 g of clean water. The falling dust amount of the dust-preventive treated quick lime was measured. The results are shown in Table 1.

Example 3

A method that the normal portland cement (a dust forming powder) is heated using the hydration reaction heat of quick lime and dust-preventive treatment is conducted is provided.

100 g of quick lime powder was put into small soil mixer of 5 L capacity, and the dispersion obtained by dispersing 1.67 g of the PTFE aqueous dispersion (I) (equivalent to 0.50% by weight of PTFE resin solid component based on the quick lime) in 35.0 g of clean water was gradually input under agitation with 140 r.p.m. of rotation speed. Steam was generated about 1 minute after input because of hydration reaction heat of quick lime, and for 2 minutes, all of the water was exhausted for hydration reaction of quick lime to form hydrated lime and then no steam generation was observed. The agitation of the mixer was stopped 5 minutes after the agitation was started. The temperature at this point measured with a mercury thermometer was 95° C. The dust-preventive treated quick lime was a mixture in a shape of ball of quick lime and hydrated lime, which contains newly formed hydrated lime because of the hydration.

This was used as a master of master batch, and 900 g of normal Portland cement was gradually put in the small soil mixer (rotation speed 140 r.p.m.) under agitating. The agitation of the mixer was stopped about 5 minutes after input of the normal portland cement. The temperature at this point measured with the mercury thermometer was 57° C. The falling dust amount of the dust-preventive treated normal portland cement was measured. The results are shown in Table 1.

Examples 4-6

200 g of the dust forming powder shown in Table 1 was preheated to 90° C. with an electric heat dryer. 20 g of heated dust forming powder and the PTFE aqueous dispersion (I) with the solid ratio (% by weight) shown in Table 1 were mixed and agitated for about 5 minutes in an alumina mortar of 1 L capacity pre-heated to 90° C. with an electric heat dryer to obtain the mixture. The mixture thus obtained was used as a master, and 180 g of remaining the heated dust forming powder was added to the mixture above. The mixture was mixed and agitated for about 5 minutes, and the dust-preventive treated dust forming powder was obtained. The falling dust amount of the dust forming powder obtained was measured. The results are shown in Table 1.

Comparative Example 1

The falling dust amount of the quick lime powder was measured. The results are shown in Table 1.

Comparative Example 2

The falling dust amount of the normal portland cement was measured. The results are shown in Table 1.

Comparative Example 3

The falling dust amount of a type II anhydrous gypsum was measured. The results are shown in Table 1.

Comparative Example 4

The falling dust amount of a blast-furnace slag powder was measured. The results are shown in Table 1.

Reference Example 1

The dust-preventive treated quick lime was obtained in the same manner as in Example 1 except that the dispersion by dispersing 1.67 g of the PTFE aqueous dispersion (II) (equivalent to 0.05% by weight of PTFE resin solid component based on the quick lime) in 98.8 g of clean water was used. The falling dust amount of the dust-preventive treated quick lime thus obtained was measured. The results are shown in Table 1.

Reference Example 2

The dust-preventive treated quick lime was obtained in the same manner as in Example 1 except that the dispersion by dispersing 1.00 g of the PTFE aqueous dispersion (II) (equivalent to 0.03% by weight of PTFE resin solid component based on the quick lime) in 99.3 g of clean water was used. The falling dust amount of the dust-preventive treated quick lime thus obtained was measured. The results are shown in Table 1.

Reference Examples 3-5

The dust-preventive treated dust forming powder was obtained in the same manner as in Example 4 to 6 except using the PTFE aqueous dispersion (II). The falling dust amount of the dust forming powder thus obtained was measured. The results are shown in Table 1.

TABLE 1

| | Dust forming powder | PTFE aqueous dispersion | PTFE amount (wt % based on dust forming powder) | Falling dust amount (CPM) |
|---|---|---|---|---|
| Example 1 | Quick lime powder | (I) | 0.05 | 9.2 |
| Example 2 | Quick lime powder | (I) | 0.03 | 12.8 |
| Example 3 | Normal Portland cement (containing quick lime powder | (I) | 0.05 | 13.0 |
| Example 4 | Normal Portland cement | (I) | 0.05 | 19.1 |
| Example 5 | Type II anhydrous gypsum | (I) | 0.10 | 62.8 |
| Example 6 | Blast-furnace slag powder | (I) | 0.06 | 14.6 |
| Comp. Ex. 1 | Quick lime powder | — | — | 164.0 |
| Comp. Ex. 2 | Normal Portland cement | — | — | 426.7 |
| Comp. Ex. 3 | Type II anhydrous gypsum | — | — | 232.1 |
| Comp. Ex. 4 | Blast-furnace slag powder | — | — | 195.1 |
| Ref. Ex. 1 | Quick lime powder | (II) | 0.05 | 13.0 |
| Ref. Ex. 2 | Quick lime powder | (II) | 0.03 | 14.5 |
| Ref. Ex. 3 | Normal Portland cement | (II) | 0.05 | 35.9 |
| Ref. Ex. 4 | Type II anhydrous gypsum | (II) | 0.10 | 60.6 |
| Ref. Ex. 5 | Blast-furnace slag powder | (II) | 0.06 | 18.5 |

APPLICABILITY TO INDUSTRIAL USE

By the present invention, the composition for dust-preventive treatment comprising an aqueous dispersion of fluorine-containing polymer, which has a lower potential for environmental concerns and a dust prevention effect as high as that of known composition for dust-preventive treatment.

What is claimed is:

1. A composition for dust-preventive treatment comprising an aqueous dispersion of fluorine-containing polymer containing 50 ppm or less of a fluorine-containing emulsifier, wherein the fluorine-containing polymer comprises polytetrafluoroethylene (PTFE) and the PTFE has an average particle size of from 0.1 μm to 0.5 μm and a specific gravity of 2.27 or lower.

2. The composition for dust-preventive treatment according to claim 1 wherein the aqueous dispersion of fluorine-containing polymer is the aqueous dispersion of fluorine-containing polymer obtained by removing the fluorine-containing emulsifier from polymer dispersion prepared by polymerizing tetrafluoroethylene using the fluorine-containing emulsifier.

* * * * *